United States Patent [19]
Harig

[11] 4,182,235
[45] Jan. 8, 1980

[54] METHOD AND ARRANGEMENT FOR BINDING ROUND BALES

[75] Inventor: Horst Harig, Harsewinkel, Fed. Rep. of Germany

[73] Assignee: Robert Bosch GmbH, Stuttgart, Fed. Rep. of Germany

[21] Appl. No.: 906,404

[22] Filed: May 16, 1978

[30] Foreign Application Priority Data

Jan. 13, 1978 [DE] Fed. Rep. of Germany ....... 2801309

[51] Int. Cl.$^2$ ........................................... B65B 13/18
[52] U.S. Cl. ......................................... 100/3; 100/4; 100/5
[58] Field of Search ....................... 100/4, 5, 13, 88, 2, 100/3, ; 56/341, 342, 343

[56] References Cited
U.S. PATENT DOCUMENTS

| | | | |
|---|---|---|---|
| 2,410,159 | 10/1946 | Harrer | 100/5 |
| 2,627,223 | 2/1953 | Berge | 100/13 |
| 3,064,556 | 11/1962 | Luebben | 100/5 |
| 3,913,473 | 10/1975 | Meiers | 100/5 |
| 3,988,977 | 11/1976 | Anderson | 100/5 |
| 4,009,559 | 3/1977 | Mast | 100/88 |
| 4,072,095 | 2/1978 | Campbell | 100/5 |

*Primary Examiner*—Billy J. Wilhite
*Attorney, Agent, or Firm*—Michael J. Striker

[57] ABSTRACT

A method of binding round bales by a rope guiding arm in a bale press which has a chamber and presses the bales while rotating them, the method comprises the steps of advancing the rope guiding arm from a rest position into a starting position before termination of the pressing step, inserting an initial portion of the rope into the pressure chamber of the press during the advancing step for engagement by and anchoring in the bale, thereafter returning the rope guiding arm back to the rest position thereof over a period of time which is longer than the time required for performing the advancing step so that the rope is withdrawn from the arm by the rotating bale and becomes convoluted about the same, and severing the rope when or shortly before the rope guiding arm reaches the rest position. The arrangement in accordance with the present invention includes the rope guiding arm operative for guiding the rope to be wound about a bale and movable between a rest position and a starting position, elements for performing the advancing, inserting and returning steps, and a device for severing the rope.

22 Claims, 9 Drawing Figures

METHOD AND ARRANGEMENT FOR BINDING ROUND BALES

BACKGROUND OF THE INVENTION

The present invention relates to a method and an arrangement for binding round bales of agricultural produces by means of a rope guiding arm which winds a rope about the bales.

Harvest produces taken from a so-called swath are received into a pressure chamber of a round bale press and spirally wound therein until the thus-formed round bales reach a diameter filling the interior of the press. During further feeding of the harvest produces into the press the round bales are compressed, and after this are bound by a binding material which is helically convoluted about the bales. Then, the bales are discharged from the press. In the conventional presses a problem is arising that the convolution of the binding material or rope about the bales requires considerable attention to be paid by the driver. On the one hand, the rope must be sufficiently convoluted about the bales so as to hold the latter, and on the other hand, unnecessary convolutions of the rope must be avoided in view of economical considerations. It has to be guaranteed that the bales in the end regions must be bound several times in the same location since no knots are provided for securing the ends of the rope. As for the central regions of the bale, it is sufficient to helically wind the rope about the same. Bale presses with binding arrangements has been known, in which the rope guiding arm can be turned by a tractor driver manually by means of a traction rope. A second traction rope is utilized for actuating the cutting arrangement for cutting the binding rope. It has been also known to actuate the rope guiding arm and the cutting arrangement by means of a single traction rope. The operation with the traction ropes for performing the binding and cutting steps requires increased attention of the tractor driver. It has been also known to move the rope guiding arm by an electric motor with the aid of a spindle or a rope winch, or by a hydraulic cylinder. During binding for controlling the speed and/or for changing the direction of movement of the rope guiding arm, the latter must be manually engaged so that the driver in these arrangements must also constantly persue the binding process.

SUMMARY OF THE INVENTION

Accordingly, it is an object of the present invention to provide a method and arrangement for binding round bales by a rope binding arm in a round bale press, which avoid the disadvantages of the prior art.

More particularly, it is an object of the present invention to provide a method and arrangement for binding round bales in which the binding process of the produced bales does not require manually controlling the same.

In keeping with these objects, and with others which will become apparent hereinafter, one feature of the present invention resides, briefly stated, in a method of binding round bales which comprises the steps of advancing a rope guiding arm from a rest position into a starting position before termination of the pressing step of the press, inserting an initial portion of the rope into the pressure chamber of the press during the advancing step for engagement by an anchoring in the bale, thereafter returning the rope guiding arm back to the rest position thereof over a period of time which is longer than the time required for performing the advancing step so that the rope is withdrawn from the arm by the rotating bale and becomes convoluted about the same, and severing the rope when or shortly before the rope guiding arm reaches the rest position. The arrangement for performing this method includes the rope guiding arm operative for guiding the rope to be wound about a bale and movable between the rest and the starting positions, means for performing the advancing, inserting and returning steps, and a device for severing the rope.

In accordance with another feature of the present invention, in order to guarantee an objectionable start of the winding process the rope guiding arm is arrested in front of a receiving opening of the bale press and in a substantially central region thereof, and is further advanced when the rope is engaged by the bale.

In accordance with still another feature of the present invention the movement of the rope guiding arm is performed without manual operations, but, instead, in response to a directly or indirectly applied pressure.

In accordance with a further feature of the present invention the movement of the rope guiding arm is performed directly or indirectly in response to the bale reaching a predetermined size.

In accordance with a still further feature of the present invention the rope guiding arm moves directly or indirectly in response to the press reaching a predetermined torque.

In accordance with an additional feature of the method of the invention, valves of the pressure chamber of the press are opened shortly before reaching the rest position of the arm.

The arrangement for binding round bales in accordance with the present invention has the following features. In accordance with one feature of the arrangement, means for moving the rope guiding arm includes a rocker arm operative for advancing the rope guiding arm and driven by a rotatable lever. The lever is provided with a roller and the rocker arm is U-shaped and has a leg arranged for guiding the roller of the lever. In accordance with another advantageous feature of the arrangement, the arm moving means includes an electric motor having a shaft, and the rotatable lever is mounted on the shaft.

The arm moving means may include a connecting rod which connects the rocker arm with the rope guiding arm.

In accordance with a further feature of the arrangement, in order to attain a possibly great turning region of the rope guiding arm, the connecting rod is connected to the rocker arm in a point which is spaced from a rocker arm support by a distance exceeding the distance by which a point of connection of the connecting rod to the rope guiding arm is spaced from a support of the latter.

It is advantageous when a power supply to the electric motor is interrupted by a switch which is actuated by the rotatable lever.

In accordance with a still further feature of the arrangement, the rope severing device is located below the arm moving means and is actuated by the latter. The severing device is so located that, on the one hand, a portion of the rope hanging from the rope guiding arm is sufficiently long in order to bind the bale, and, on the other hand, cannot be unintentionally engaged by connecting elements or pressed produce.

In accordance with yet another feature of the present invention, the cutting arrangement has a switching rod provided with a turnable lever and actuated by the rotatable lever of the rope guiding arm arrangement.

In accordance with an additional feature of the arrangement, the severing device is so arranged that the rope hanging from the rope guiding arm is guided so as to provide for multiple convoluting of the bale at the same location, and a backing arm is provided operative for outwardly moving the rope guiding arm. In accordance with a still additional feature of the arrangement, the end regions of the bale is wound by the rope more than one time, and cutting means of the severing device is spaced from the rope backing arm by a distance which is smaller than a distance between the lateral sides of the bale to be bound.

In accordance with yet another feature of the arrangement, all elements operative for moving the rope guiding arm is mounted on a single plate.

A further important feature of the arrangement is that a clamping device is provided operative for clamping the rope in the rest position of the rope guiding arm.

In order to attain that the rope guiding arm is moved and arrested in a position intermediate the rest and starting positions so that the rope can be engaged by the bale, power supply of the electric motor may be interrupted in this intermediate position of the rope guiding arm by a further lever mounted on the shaft of the electric motor. A switch may be provided, actuated by the further lever and operative for interrupting the power supply to the electric motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings. dr

BRIEF DESCRIPTION OF THE DRAWING

FIGS. 5-8 are views showing means for actuating the binding arrangement, in accordance with three embodiments of the invention.

DESCRIPTION OF A PREFERRED EMBODIMENT

Figure 1:
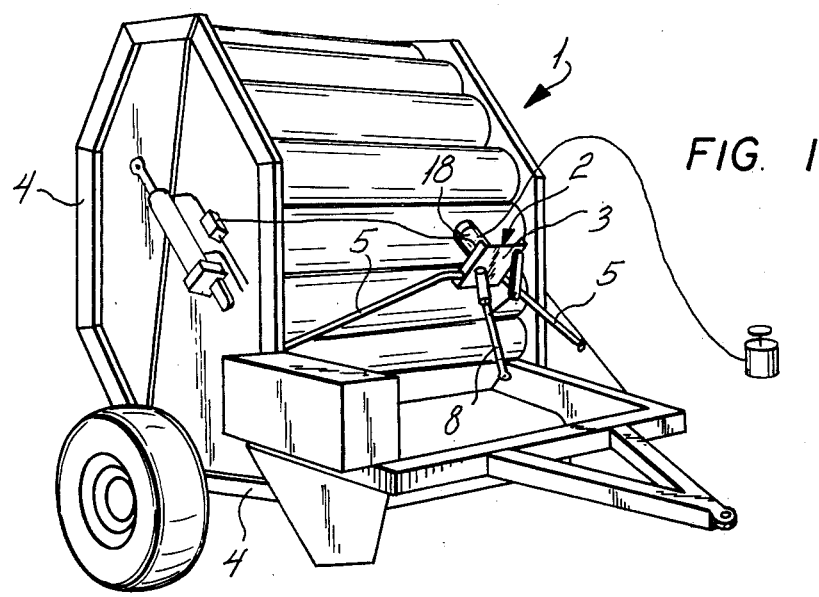
FIG. 1 is a view showing a round bale press with a binding arrangement.

A bale press for pressing bales is identified by reference numeral 1, whereas an arrangement for binding the bales is identified by reference numeral 2. The binding arrangement has a base plate 3 which is formed as a bent sheet structure and supported by rods 5. The latter are connected with the frame 4 of the bale press 1. A lever 7 is turnably mounted on the base plate 3 by means of a pin 6. A rope guiding arm 8 is fixedly connected with the lever 7.

The rope guiding arm 8 is connected, in turn, with a rocker arm 10 through a connecting rod 9. Another end of the rocker arm 10 is turnably connected with the base plate 3 by means of a bolt 11. A further lever 12 is mounted by the bolt 11 outside the rocker arm 10. The free end of the lever 12 engages with a spring 13 whose other end is connected with the base plate 3 by means of a console.

Figure 3:
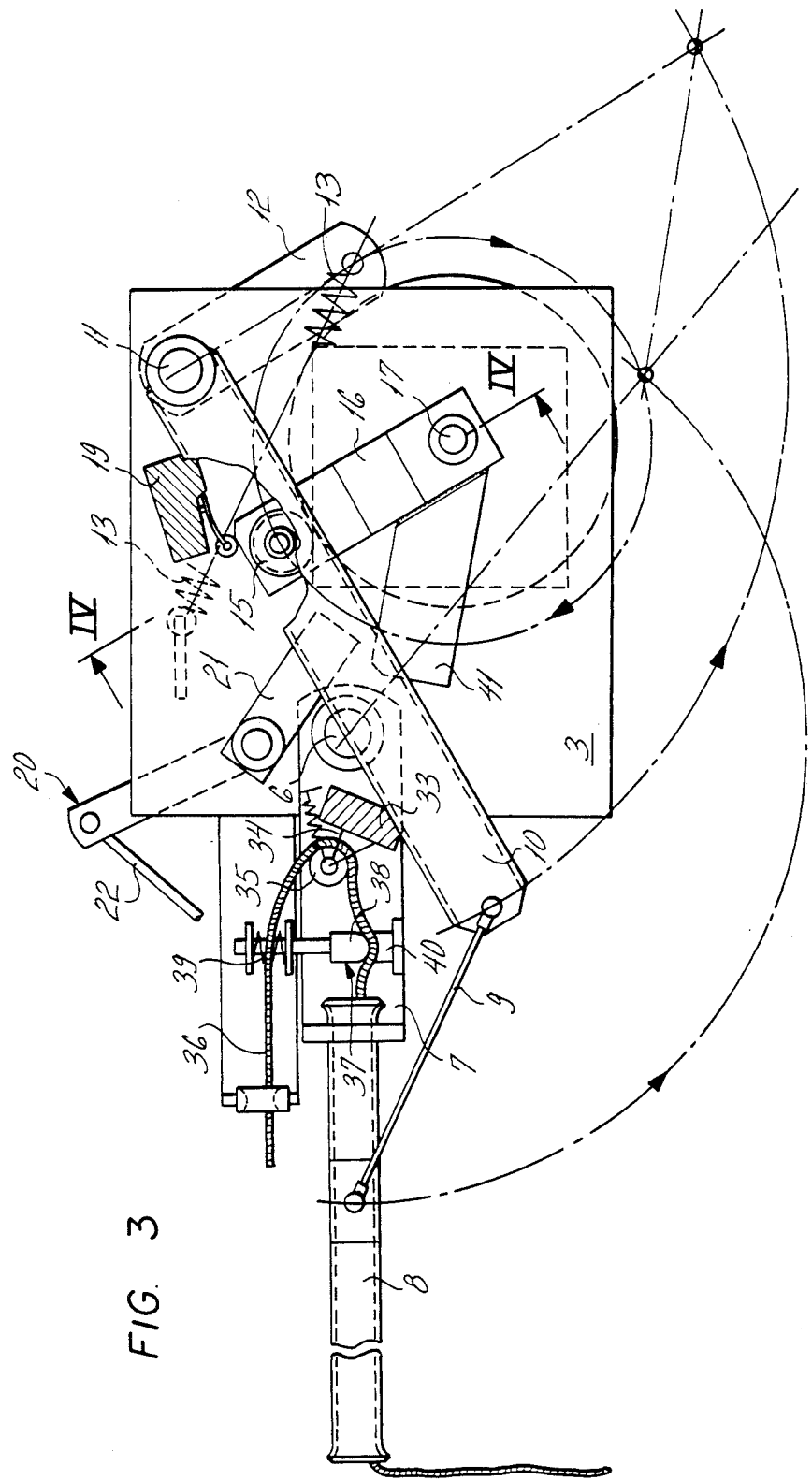
FIG. 3 is a view showing an enlarged section of the binding arrangement shown in FIG. 2.
Figure 4:
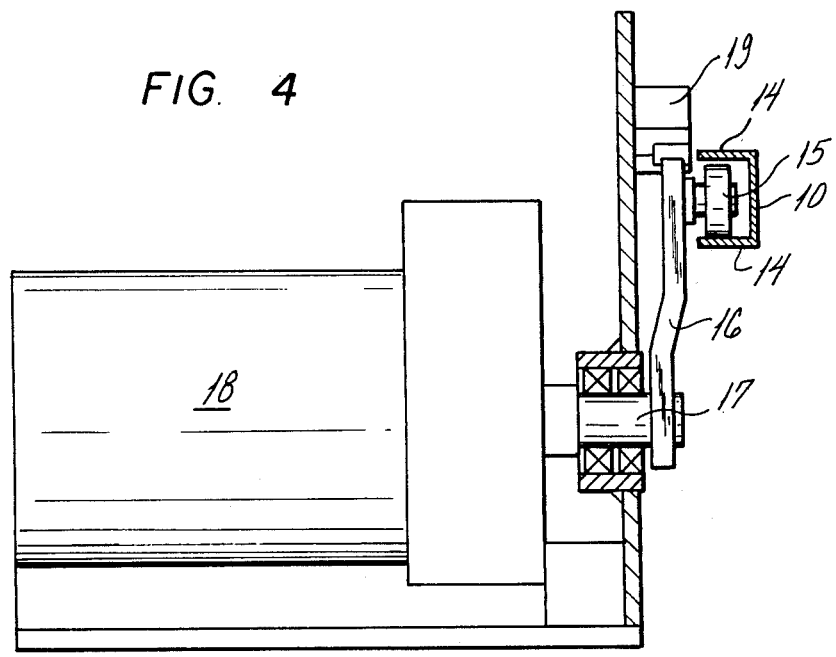
FIG. 4 is a view showing drive means of a rocker arm of the binding arrangement in section taken along the line IV—IV of FIG. 3.

As shown in FIG. 4, the rocker arm 10 has a U-shaped cross-section whose both arms 14 serve as guiding means for a roller 15. The roller 15 is mounted on a bent lever 16 which is secured to an end portion of a shaft 17 of the electric motor 18. In an end position which is shown in FIG. 3, the current supply to the electric motor 18 is interrupted inasmuch as the end of the bent lever 16 acts upon a limit switch 19 mounted on the base plate 3.

As can be seen from the drawing, a further two-armed lever 20 is turnably connected with the base plate 3, and an arm 21 of the lever 20 is also actuated from the end of the bent lever 16, whereas another arm of the lever 20 is connected with a segment 24 of a cutting arrangement 23 through a switching rod 22. The cutting arrangement 23 comprises a plate 25 with a receiving opening 26, a cutting blade 27, and a clamping segment 28 turnable against the force of a spring 32. Mounting of the cutting arrangement 23 is performed by a tubular member 30 supported between frame supports 29. A backing arm 31 is connected with the tubular member 30 at an end region opposite to the cutting arrangement 23.

A further lever 41 is connected with the shaft 17 and also acts upon the limit switch 19 so as to lock the electric motor 18. The limit switch 19 is interlocked by a further switch 33 which is actuated under the action of tension of the rope.

A method of binding of round bales in connection with this arrangement will now be explained.

When a bale is completed in the bale press, oil pressure which builds up in connecting cylinders of valves of the bale press chamber triggers the limit switch 19 through a not shown pressure switch and thereby the electric motor 18 is actuated. The bent lever 16 which is mounted on the shaft of the electric motor 18 rotates from a rest position or end position shown in FIG. 3 in clockwise direction. The roller 15 connected with the lever 16 first turns the rocker arm 10 during a first phase of movement to a reversal point about the pin 11. This movement is performed relatively fast and in a direction opposite to the clockwise direction. Simultaneously, the rope guiding arm 8 is moved by the rocker arm 10 through the connecting rod 9 from the rest position shown in FIG. 3 to a position shown in FIG. 1. During this movement a binding element such as a rope which hangs out of the rope guiding arm 8, is engaged by material still entering the bale press chamber and becomes anchored in the material.

In order to guarantee this anchoring in any case, the limit switch 19 is actuated by the lever 41 in an intermediate position of the rope guiding arm, and thereby the current supply to the electric motor 18 is interrupted. The limit switch 19 can be interlocked by the further switch 33, and this takes place when the switch 33 is actuated by the tension of the rope. This tension is first caused when the rope is actually inserted into the bale.

As shown in FIG. 3 an actuating lever 34 is provided with a roller 35 about which the rope 36 is wound. During a further rotation of the shaft 17 and thereby of the bent lever 16 the movement of the rocker arm 10 together with the connecting rod 9 and the rope guiding arm 8 is reversed and these elements slowly move back in clockwise direction to the end position shown in FIG. 3 by means of the above-described kinematic connection. In this end position the current supply to the electric motor is interrupted by operation of the limit switch 19 through the free end of the bent lever 16. During these slow movements of the rope guiding arm 8 the rope is pulled out of the latter and is continuously helically convoluted about the bale. In this convoluting phase the operation of the press is stopped so that no further material to be pressed is supplied into the press chamber.

Figure 2:
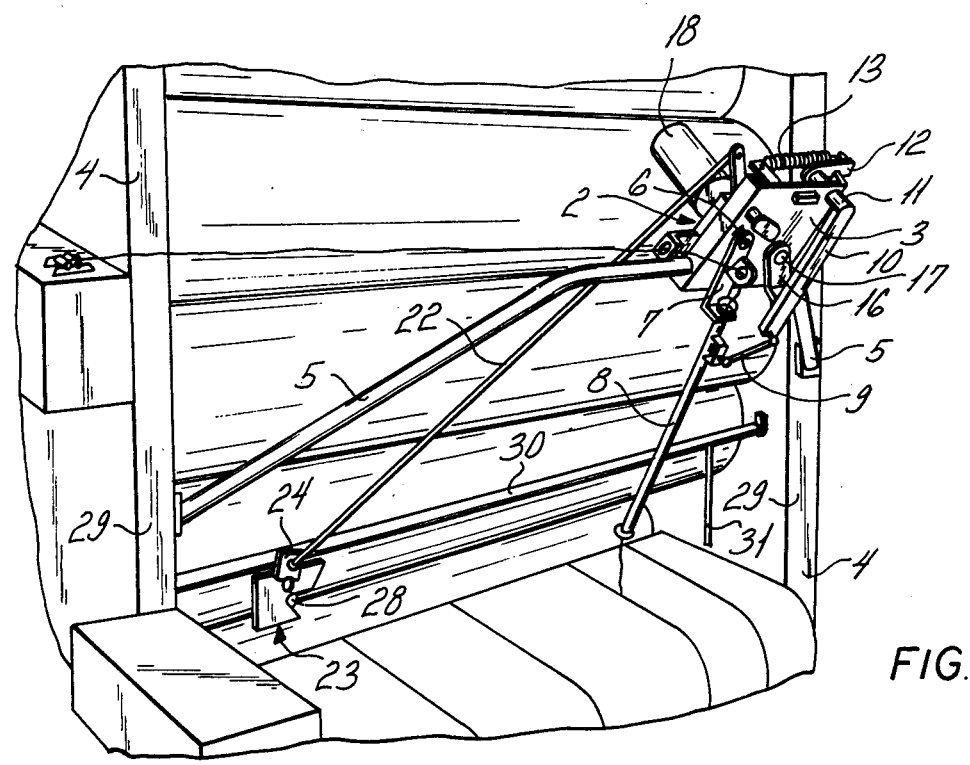
FIG. 2 is an enlarged view of the binding arrangement shown in FIG. 1.
Figure 5:
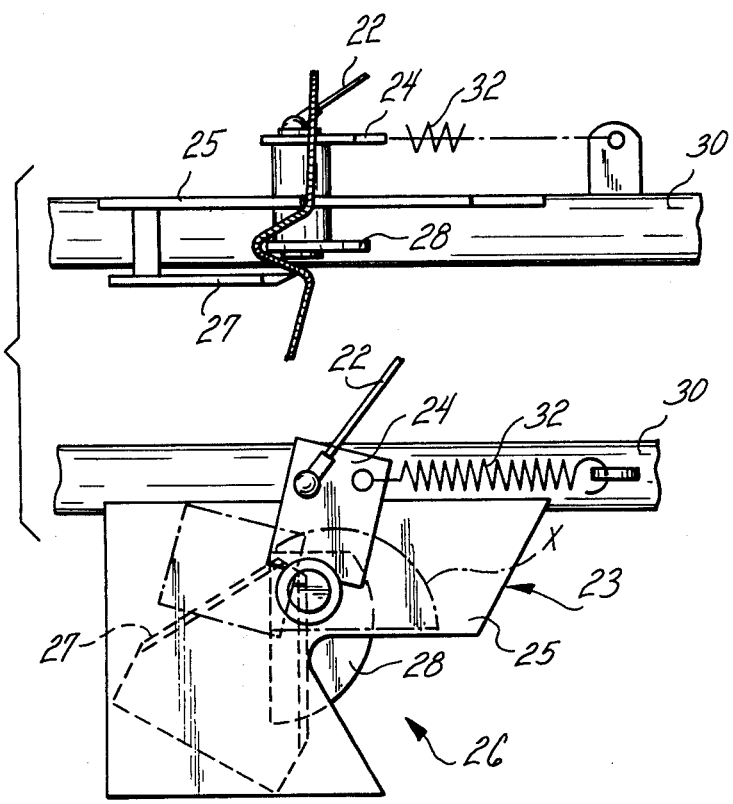
FIG. 5 is a front end plan view of a rope severing device of the binding arrangement.

Shortly before the rope guiding arm reaches the end position shown in FIG. 3, the free arm 21 of the lever 20 is turned from the free end of the bent lever 16, whereby the segment 28 of the cutting arrangement moves by the switching rod 22 to a position which is shown in FIG. 5 in dotted lines and identified by reference letter X against the force of the spring 32. The rope which was located before in front of the segment 28, is then received in the recess 26 of the plate 25. In the moment when the free end of the bent lever 16 of the arm 21 of the two-armed lever 20 is released, the segment 28 under the action of the spring 32 moves with impact action so that the rope is pressed in the free gap between the plate 25 and the fixedly mounted cutting blade 27. During this movement the rope is severed by the edge of the cutting blade 27. As shown in FIG. 2 the end of the rope which hands out of the rope guiding arm 8 is so dimensioned that during the subsequent convoluting it is guaranteed that the end portion of the rope is actually engaged and drawn into the area of convolution by the incoming material.

In order to wind the rope in the end regions of the bale more than once, the backing arm 31 is provided on the tubular member 30 as shown in FIG. 2, which backing arm 31 retains the rope pulled out of the rope guiding arm 8 in this position, when the rope guiding arm 8 moves further outwardly through this region. In this position i.e., when the rope guiding arm moves further outwardly and thereafter moves back to the arm 31 the rope is convoluted about the bale only in the region of the arm 31. Thus, a multiple winding of the rope takes place.

The cutting arrangement is mounted on the end of the tubular member 30 which is opposite to the arm 31. The operation of this arrangement 23 is so selected in the sense of time that it does not operate when the rope guiding arm 8 moves near the same, but, instead, when the rope guiding arm almost reaches its end position when it is outwardly offset relative to the arrangement 23. Thereby, in this position a multiple convoluting of the bale is attained.

In the above-shown and described arrangement in accordance with the present invention, operation of the rope guiding arm 8 is performed by a pressure switch or hand switch which controls all necessary steps automatically without manual handles. The driver of the traction vehicle does not have to pay any attention to convoluting process or winding process which is required in the conventional binding arrangements. The operation of the switches controlling the beginning of the winding process may be actuated by the driver of the traction machine himself. It can be also performed automatically. For instance, the arrangement can be actuated in response to a predetermined pressure which is built in the connecting cylinders of the valves in the pressure chamber of the press, which pressure relieves a pressure switch or a control valve. Another possibility for actuating the limit switch which controls the beginning of the winding process is that the limit switch can be actuated in response to a predetermined torque due to the deformation of a part of the arrangement depending upon the drive, for instance, by means of the limit switch on tightening device or by means of a device for measuring stretching on the housing of the limit switch.

Figure 6:
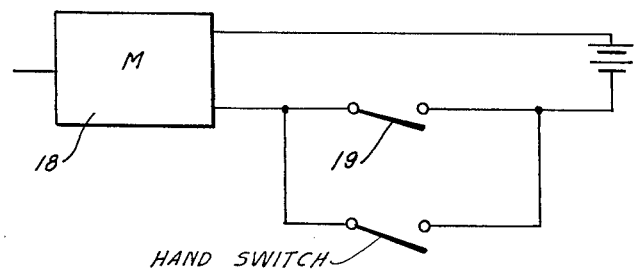

Various forms of the actuation are illustrated in FIGS. 6–9. In FIG. 6 the actuation of the binding process is performed by hand by pressing the hand switch. The lever 41 is so formed that the switch 19 during the first phase of movement is actuated and interrupts the current supply so that by switching off of the hand switch the electric motor 18 and thereby the rope guiding arm is held in the region 1of a receiving opening in order to provide for the time for engaging the end portion of the rope. By switching off of the hand switch the switch 19 is interlocked. As soon as the lever 41 is rotated so far that the switch is no longer pressed and thereby can be switched in, the hand switch can be released and the binding process is performed automatically until the switch 19 is switched off by the lever 41.

Figure 7:
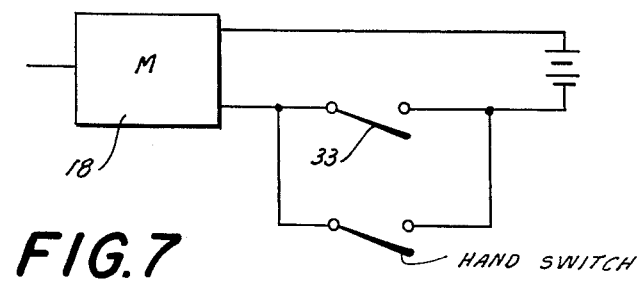

FIG. 7 the actuation of the binding process is performed by pressing of the hand switch until the rope guiding arm is located in the middle of the receiving opening. As soon as the rope is engaged, the switch 33 is witched on from the rope through the roller 35 and thereby the switched off hand switch is interlocked. After the rope is cut off the roller 35 is drawn back by the pulling string and thereby the switch 33 is switched off.

Figure 8:
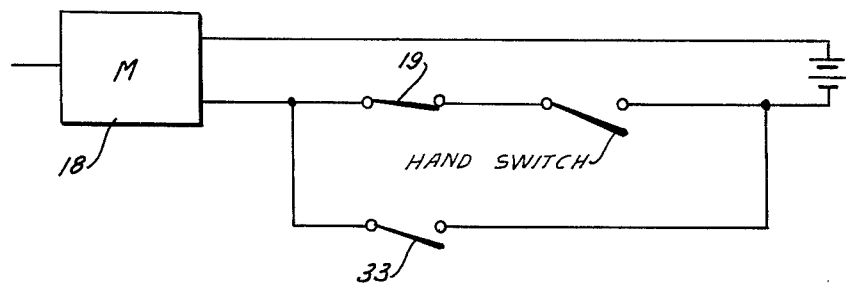

In FIG. 8 the actuation of the binding process is performed by pressing of the hand switch or by attaining a predetermined pressure through the pressure switch, or by attaining a predetermined driving torque through the switch on the wheel chain tensioning device. When the rope guiding arm is located in the middle of a receiving opening, the current flowing through the switch 19 is interrupted by the lever 41 as soon as the rope is engaged, and thereby the switch 19 is interlocked. In this case the lever 16 is so short that it does not contact the switch 19, that is in the rest position the switch 19 is switched on. During the binding process the pressure switch for the chain tensioning device switch opens, since the press pressure or the torque increases as a result of interrupted supply of the product.

Figure 9:
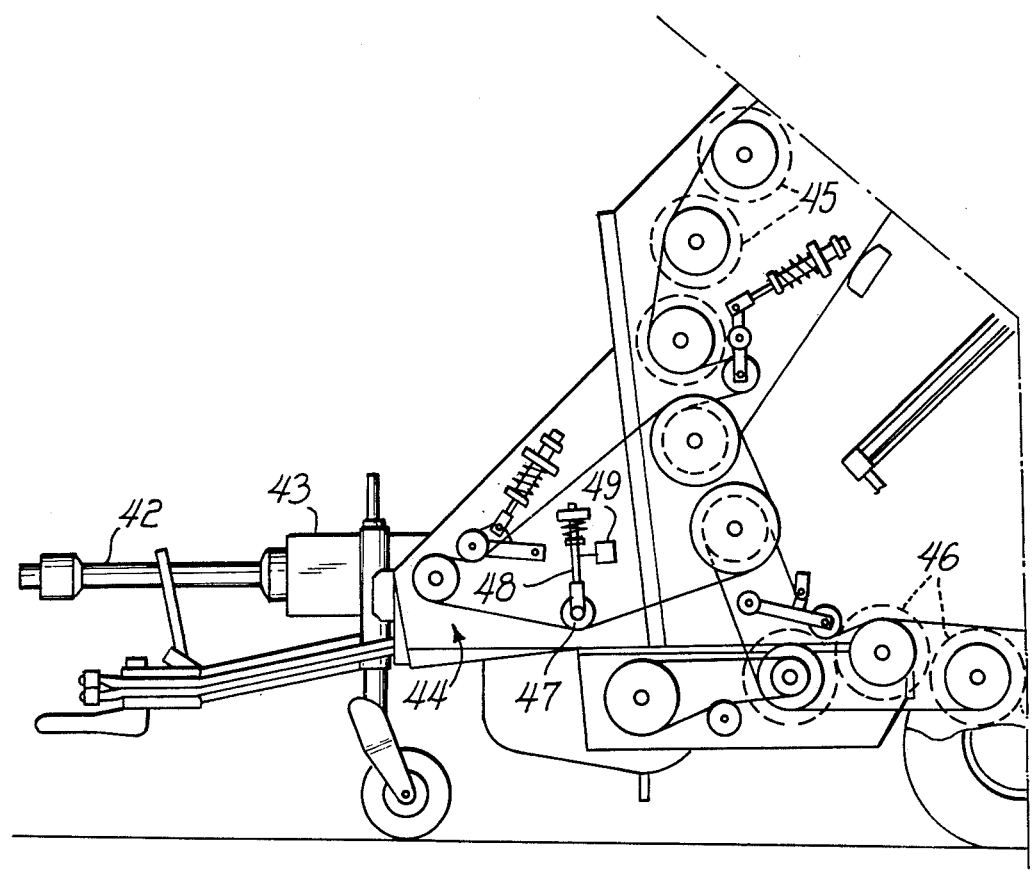
FIG. 9 shows a portion of the bale press with further means for actuating the binding arrangement.

FIG. 9 illustrates how the advancing step may be performed in response to the torque. The drive means of the press include a pivotal shaft 42 which is driven from a tractor and connected with a miter-wheel transmission 43 from which the movement is transmitted through the cone belt or chain to driven 44 in several directions to drums 45 and 46. The advancing step is performed in response to the torque of the drive means of the press. More particularly, a spring-biased feeler rod 47 is provided which abuts against the drive 44 and actuates a switch 49 in response to a predetermined loading of the drive 44.

As shown in FIG. 3, an arrangement 37 for clamping the rope is provided, which has a push rod 38, a spring 39, and a lug cam 40. The lug cam 40 is fixedly connected to the rope guiding arm 8 so that the rope 36 which is supplied between the lug cam 40 and the spring loaded push rod 38 is first clamped between the same when the rope guiding arm 8 is further moved through the position shown in FIG. 3 outwardly in clockwise direction.

The motor 18 is restarted after it stops, and the switch 33 is operated by tension of the rope in the following manner. By the tension of the oncoming end of the rope the switch 33 is actuated by the rope. The switch 19 is thereby interlocked and the current from the motor 18 starts to flow again.

It will be understood that each of the elements described above, or two or more together, may also find a useful application in other types of constructions differing from the types described above.

While the invention has been illustrated and described as embodied in a method and arrangement for binding round blades, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential charactersitics of the generic or specific aspects of this invention.

What is claimed as new and desired to be protected by Letters Patent is set forth in the appended claims:

1. A method of binding round bales by a rope guiding arm in a round bale press which has a chamber and presses the bales while rotating them, the method comprising the steps of automatically advancing the rope guiding arm from a rest position into a starting position before termination of the pressing step; inserting an initial portion of the rope into the pressure chamber of the press during said advancing step for engagement by and anchoring in the bale, said advancing step including arresting the rope guiding arm in front of a receiving opening of the bale press and in a substantially central region thereof, and further advancing the same after the rope is engaged by the bale and the bale applys a predetermined back-pressure, said advancing step being performed in response to sensing of said pressure; thereafter returning the rope guiding arm back to said rest position thereof over a period of time which is longer than the time required for performing said advancing step so that the rope is withdrawn from said arm by the rotating bale and becomes convoluted about the same, said returning step including helically convoluting the rope about the bale between the end regions of the bale several times at one place and between the end regions of the bale; and severing the rope when or shortly before the rope guiding arm reaches the rest position.

2. The method as defined in claim 1, wherein said applying step includes directly transmitting said pressure.

3. The method as defined in claim 1, wherein said applying step includes indirectly transmitting said pressure.

4. The method as defined in claim 1, wherein said applying step includes automatically opening valves of the pressure chamber short before the arm reaches the rest position.

5. A method of binding round bales by a rope guiding arm in a round bale press which has a chamber and presses the bales while rotating them, the method comprising the steps of automatically advancing the rope guiding arm from a rest position into a starting position before termination of the pressing step; inserting an initial portion of the rope into the pressure chamber of the press during said advancing step for engagement by and anchoring in the bale, said advancing step including arresting the rope guiding arm in front of a receiving opening of the bale press and in a substantially central region thereof, and further advancing the same after the rope is engaged by the bale, the pressing having a rotatable drive means reaching a predetermined torque, said advancing step being performed in response to sensing of said torque; thereafter returning the rope guiding arm back to said rest position thereof over a period of time which is longer than the time required for performing said advancing step so that the rope is withdrawn from said arm by the rotating bale and becomes convoluted about the same, said returning step including helically convoluting the rope about the bale between the end regions of the bale several times at one place and between the end regions of the bale; and severing the rope when or shortly before the rope guiding arm reaches the rest position.

6. The method as defined in claim 5, wherein said performing step includes directly transmitting a signal corresponding to said predetermined torque.

7. The method as defined in claim 5, wherein said performing step includes indirectly transmitting a signal corresponding to said predetermined torque.

8. An arrangement for binding round bales in a round bale press having a chamber and pressing the bales while rotating the same, the arrangement comprising a rope guiding arm operative for guiding the rope to be wound about a bale and automatically movable between a rest position and a starting position; means for advancing said rope guiding arm from said rest position into said starting position before termination of the pressing step so as to insert the rope into the pressure chamber for engagement by and anchoring in the bale, and thereafter returning the rope guiding arm back to said rest position over the period of time which is longer than the time required for the advancing so that the rope is withdrawn from said rope guiding arm by the rotating bale and becomes helically convoluted about the bale in the end regions of the bale several times at one place and between the end regions of the bale, said means being operative for arresting the rope guiding arm in front of a receiving opening of the bale press and in a substantially central region thereof and further advancing the same after the rope is engaged by the bale, said means including a rocker arm operative for advancing said rope guiding arm and a rotatable lever operative for driving said rocker arm; and a device for severing the rope when or shortly before said rope guiding arm reaches the rest position.

9. The arrangement as defined in claim 8, wherein said lever is provided with a roller, said rocker arm being U-shaped and having a leg arranged for guiding said roller of said lever.

10. The arrangement as defined in claim 8, wherein said means further includes an electric motor having a rotatable shaft, said lever being mounted on said shaft and rotatable therewith.

11. The arrangement as defined in claim 10, wherein said means includes a switch operative for interrupting power supply to said electric motor and actuated by said rotatable lever.

12. The arrangement as defined in claim 11, and further comprising a further switch provided with an actuating lever and a roller mounted on the latter and operative for guiding the rope so that said further switch is actuated by the tension of the rope to interlock said first-mentioned switch.

13. The arrangement as defined in claim 10, wherein said rope guiding arm is movable to and arrestable in a position intermediate said rest and starting positions, said means including a further lever mounted on said shaft and operative for interrupting power supply to said electric motor in said intermediate position of said rope guiding arm.

14. The arrangement as defined in claim 13, wherein said means includes a switch actuated by said further lever and operative for interrupting the power supply to said electric motor.

15. The arrangement as defined in claim 8, wherein said means includes a connecting rod which connects said rocker arm with said rope guiding arm.

16. The arrangement as defined in claim 15, wherein said means includes a first support for supporting said rope guiding arm and a second support arranged for supporting said rocker arm, said connecting rod being connected to said rocker arm in a point which is spaced from said second support by distance exceeding a distance by which a point of connection of said connecting rod to said rope guiding arm is spaced from said first support.

17. The arrangement as defined in claim 8, wherein said rope severing device is located below said means and actuated by the latter.

18. The arrangement as defined in claim 17, wherein said severing device includes a switching rod provided with a turnable lever and actuated by said rotatable lever of said means.

19. The arrangement as defined in claim 18, wherein said rope severing device includes an arm operative for backing the rope.

20. The arrangement as defined in claim 18, wherein said rope severing device includes cutting means which is spaced from said rope backing arm by a distance which is smaller than a distance between the lateral sides of the bale to be bound.

21. The arrangement as defined in claim 8; and further comprising a supporting plate on which said means are mounted.

22. The arrangement as defined in claim 8, wherein said means includes a clamping device operative for clamping the rope in said rest position of said rope guiding arm.

* * * * *

UNITED STATES PATENT AND TRADEMARK OFFICE
CERTIFICATE OF CORRECTION

PATENT NO. : 4,182,235
DATED : January 8, 1980
INVENTOR(S) : Horst Harig

It is certified that error appears in the above-identified patent and that said Letters Patent are hereby corrected as shown below:

[73] The name and address of the Assignee should read

-- GEBR. CLAAS MASCHINENFABRIK G.M.B.H., Harsewinkel, Federal Republic of Germany --.

Signed and Sealed this

Twenty-fourth Day of June 1980

[SEAL]

Attest:

SIDNEY A. DIAMOND

Attesting Officer

Commissioner of Patents and Trademarks